(12) United States Patent
Nakabayashi (10) Patent No.: US 6,568,269 B2
(45) Date of Patent: May 27, 2003

(54) ACCELERATION SENSOR AND MANUFACTURING METHOD THEREOF

(75) Inventor: Masakazu Nakabayashi, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/985,370

(22) Filed: Nov. 2, 2001

(65) Prior Publication Data

US 2002/0178818 A1 Dec. 5, 2002

(30) Foreign Application Priority Data

Jun. 1, 2001 (JP) ........................................ 2001-167337

(51) Int. Cl.[7] ............................................ G01P 15/125
(52) U.S. Cl. ........................ 73/514.32; 438/48; 361/280
(58) Field of Search ........................ 73/514.32, 514.36, 73/504.12, 504.04; 361/280, 283.1, 283.3; 438/48, 50

(56) References Cited

U.S. PATENT DOCUMENTS 5,959,208 A * 9/1999 Muenzel et al. ......... 73/514.32
6,430,999 B2 * 8/2002 Murata et al. ........... 73/514.36

FOREIGN PATENT DOCUMENTS

| JP | 8-88457 | 4/1996 |
| JP | 10-19924 | 1/1998 |

* cited by examiner

Primary Examiner—John E. Chapman
(74) Attorney, Agent, or Firm—Oblon, Spivak, McClelland, Maier & Neustadt, P.C.

(57) ABSTRACT

The invention provides a highly reliable acceleration sensor capable of being manufactured at a low cost easily, and a manufacturing method the acceleration sensor. The acceleration sensor comprises: a fixed electrode (50, a movable electrode (40), and a mass member (30) joined to the movable electrode (40) and displaceable. The mass member (30) is mainly constructed of a thin polyimide membrane (2). Therefore the acceleration sensor can be manufactured in a shorter period of time and more easily as compared with a conventional construction utilizing a polysilicon membrane, and a shorter manufacturing time and lower cost is achieved.

8 Claims, 6 Drawing Sheets

Prior Art

ACCELERATION SENSOR AND MANUFACTURING METHOD THEREOF

BACKGROUND OF THE INVENTION

1. Technical Field

The present invention relates to an acceleration sensor and to a manufacturing method thereof.

2. Background Art

Figure 6:
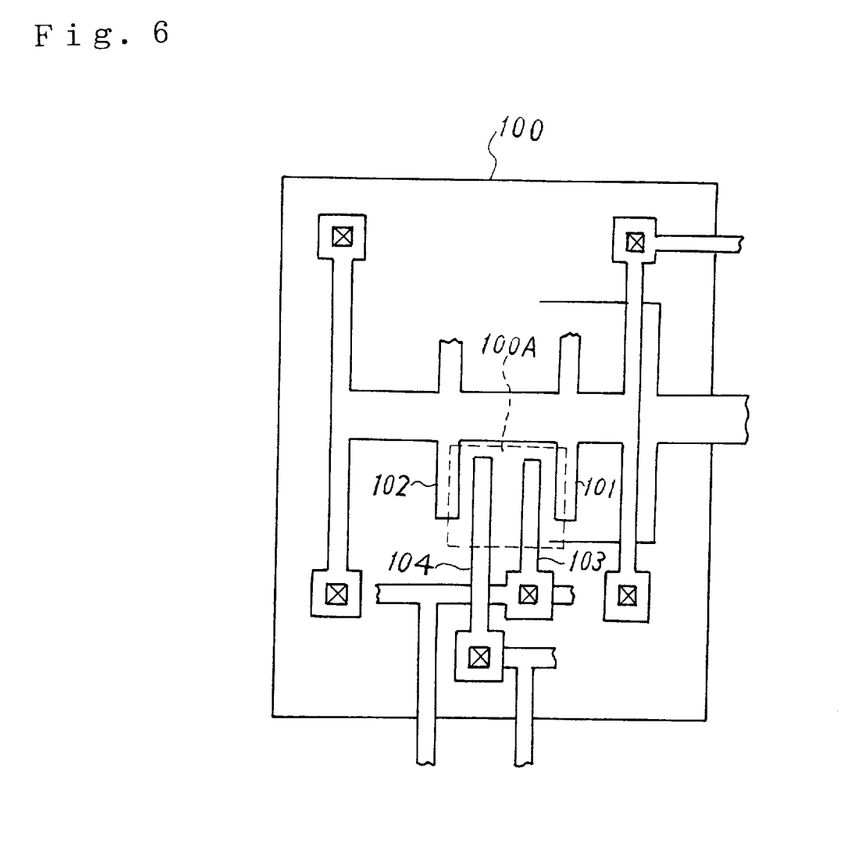
FIG. 6 is a plan view showing a part of a conventional acceleration detector.

FIG. 6 is, for example, a plan view showing a part of an acceleration detector of a monolithic capacitance type disclosed in the Japanese Patent Publication (unexamined) No. 178954/1996. In this conventional art, the acceleration detector 100 contains a differential capacitor 100A surrounded by a dotted line in the drawing. The differential capacitor 100A includes a pair of capacitors. A first capacitor is formed between two electrodes 101, 103, and a second capacitor is formed between two electrodes 102, 104. The electrodes 101, 102 are electrically common. The common electrodes 101, 102 are lifted from a silicon substrate and are moving electrodes movable in response to acceleration. The other electrodes 103, 104 are stationary fixed electrodes. These electrodes 101, 102, 103 and 104 are all made of a polysilicon material. When acceleration is applied to the substrate, the movable electrodes 101, 102 being the common electrodes will move in such a manner that capacitance of the second capacitor may increase and capacitance of the first capacitor may decrease. These two capacitors are connected to a signal regulation circuit wherein the differential capacitance is converted into a corresponding voltage. By this voltage value, acceleration is detected.

It is a recent trend that smaller and cheaper acceleration sensor has been increasingly required. In the conventional acceleration sensor as described above, however, the polysilicon material deposited onto the silicon substrate by plasma CVD method must be formed approximately ten times as thick as a polysilicon membrane used in ordinary LSI. Therefore, the conventional acceleration sensor takes an extremely long period for deposition in a plasma CVD apparatus, resulting in a problem of longer construction time and increasing cost. Moreover, since distances between the moving electrodes 101, 102 and the fixed electrodes 103, 104 bear a direct relation to increase or decrease of capacitance of the capacitors, it is important to form these electrodes precisely at their positions. However, particularly the moving electrodes 101, 102 are liable to be warped due to residual stress of polysilicon, whereby the fixed electrodes 103, 104 and the moving electrodes 101, 102 may be varied from designed values in relative positions and distances thereof. Accordingly, performance of individual acceleration sensors is not always uniformly or stably exhibited thereby eventually causing another problem of lower product reliability.

SUMMARY OF THE INVENTION

The present invention was made to solve the above-discussed problems, and has an object of providing an acceleration sensor capable of being manufactured economically as well as easily and which is highly reliable. The invention also provides a manufacturing method of the acceleration sensor.

An acceleration sensor according to the invention comprises: a fixed electrode including a plurality of first rod-like patterns aligned parallel to each other on a substrate surface; a movable electrode including a plurality of second rod-like patterns aligned parallel to each other over the substrate surface so as to be opposite to each of the plurality of said first rod-like patterns with predetermined distances; and a mass member disposed over the substrate surface and joined to said movable electrode to be displaceable together with said movable electrode;

wherein said mass member includes a thin polyimide membrane provided over the substrate surface and silicon nitride membranes provided respectively on a pair of main surfaces of said thin polyimide membrane substantially parallel to the substrate surface.

By this acceleration sensor according to the invention, a shorter construction time and lower cost have been achieved as compared with the conventional construction mainly fabricated of a polysilicon membrane. Further, since the silicon nitride membrane is provided as a flattening membrane onto a pair of the main surfaces of the thin polyimide membrane substantially parallel to the substrate surface, the thin polyimide membrane is restrained from being warped. Therefore the movable electrode and the fixed electrode can be formed at precisely the same relative positions and distances as designed. As a result, instability or non-uniformity in performance of individual apparatus can be surpassed whereby a highly reliable acceleration sensor can be eventually obtained.

In the acceleration sensor according to the invention, it is preferable that each of said silicon nitride membranes is covered with a metal membrane, and that end faces between the pair of said main surfaces of said thin polyimide membrane are covered with a metal membrane.

Another acceleration sensor according to the invention comprises: a fixed electrode including a plurality of first rod-like patterns aligned parallel to each other on a substrate surface; a movable electrode including a plurality of second rod-like patterns aligned parallel to each other over the substrate surface so as to be opposite to each of the plurality of said first rod-like patterns with predetermined distances; and a mass member including a thin polyimide membrane disposed over the substrate surface and joined to said movable electrode to be displaceable together with the movable electrode,;

wherein a pair of main surfaces of said thin polyimide membrane substantially parallel to the substrate surface and end faces between the pair of the main surfaces of said polyimide membrane are respectively covered with a metal membrane.

By this acceleration sensor according to the invention, a shorter construction time, lower cost and higher reliability due to restraint of the polyimide membrane from being warped, a plating process conventionally required can be omitted. As a result, there arises a further advantage of simplifying the manufacturing process.

In the acceleration sensor according to the invention, it is preferable that said metal membrane is formed by the material selected from the group consisting of tungsten (W) and titanium nitride (TiN).

By this acceleration sensor according to the invention, the metal membrane is formed by the material selected from the group consisting of tungsten (W) and titanium nitride (TiN), thereby being capable of serving as a flattening membrane for restraining the polyimide membrane from being warped and as a metal membrane necessary for use as an electrode.

A method of manufacturing an acceleration sensor according to the invention, the acceleration sensor comprising: a fixed electrode including a plurality of first rod-like patterns aligned parallel to each other on a substrate surface; a movable electrode including a plurality of second rod-like patterns aligned parallel to each other over the substrate surface so as to be opposite to each of the plurality of said first rod-like patterns with predetermined distances; and a mass member disposed over the substrate surface and joined to said movable electrode to be displaceable together with said movable electrode;

the method comprises the steps of:

forming a silicon oxide membrane on the substrate surface by plasma CVD method;

applying a first resist onto the silicon oxide membrane and patterning said first resist by photomechanical process;

removing a predetermined portion of said silicon oxide membrane by etching using said first resist as a mask;

forming a first silicon nitride membrane on the substrate surface by plasma CVD method for covering said silicone oxide membrane;

applying a polyimide material onto said first silicon nitride membrane and forming a thin polyimide membrane by setting the polyimide material at 300° C. to 370° C.;

forming a second silicon nitride membrane on said thin polyimide membrane by plasma CVD method;

applying a second resist onto said second silicon nitride membrane and patterning said second resist by photomechanical process;

etching sequentially said second silicon nitride membrane, said thin polyimide membrane and said first silicon nitride membrane using said second resist as a mask, thereby forming on the substrate surface a first block including the plurality of said first rod-like patterns at said predetermined portion, and a second block including the plurality of said second rod-like patterns and a mass block joined thereto;

removing said silicon oxide membrane by etching and separating said second block from the substrate surface; and coating a main surface of said first block substantially parallel to the substrate surface and end faces thereof with a metal membrane thereby forming said fixed electrode, and coating a pair of main surfaces of said second block substantially parallel to the substrate surface and end faces thereof with the same metal membrane thereby forming said movable electrode and said mass member.

In this method of manufacturing an acceleration sensor according to the invention, the method includes the step of applying the polyimide material onto the first silicon nitride membrane and forming the thin polyimide membrane by setting the polyimide material at 300° C. to 370° C. Therefore the acceleration sensor can be manufactured in a shorter time and more easily as compared with the conventional method wherein the polysilicon membrane is formed by plasma CVD method. As a result, a shorter construction time and lower cost have been achieved.

Another method of manufacturing an acceleration sensor according to the invention, the acceleration sensor comprising: a fixed electrode including a plurality of first rod-like patterns aligned parallel to each other on a substrate surface; a movable electrode including a plurality of second rod-like patterns aligned parallel to each other over the substrate surface so as to be opposite to each of the plurality of said first rod-like patterns with predetermined distances; and a mass member disposed over the substrate surface and joined to said movable electrode to be displaceable together with said movable electrode;

the method comprises the steps of:

forming a silicon oxide membrane onto the substrate surface by plasma CVD method;

applying a first resist onto said silicon oxide membrane and patterning said first resist by photomechanical process;

removing a predetermined portion of said silicon oxide membrane by etching using said first resist as a mask;

applying a polyimide membrane onto the substrate surface and forming a thin polyimide membrane by setting the polyimide material at 300° C. to 370° C.;

applying a second resist onto said thin polyimide membrane and patterning said second resist by photomechanical process;

etching said thin polyimide membrane using said second resist as the mask thereby forming on the substrate a first block including a plurality of first rod-like patterns at said predetermined portion, and a second block including a plurality of second rod-like patterns and a mass block joined thereto;

removing the mentioned silicon oxide membrane by etching and separating said second block from the substrate surface; and coating a main surface of said first block substantially parallel to the substrate surface and end faces thereof with a metal membrane thereby forming said fixed electrode, and further coating a pair of main surfaces of said second block substantially parallel to the substrate surface and end faces thereof with the same metal membrane thereby forming said movable electrode and said mass member.

In the method of manufacturing an acceleration sensor according to the invention, the method includes the step of applying the polyimide material onto the first silicon nitride membrane and forming the thin polyimide membrane by setting the polyimide material at 300° C. to 370° C. Therefore the acceleration sensor can be manufactured in a shorter time and more easily as compared with the conventional method wherein the polysilicon membrane is formed by plasma CVD method. As a result, a shorter construction time and lower cost have been achieved.

In the method of manufacturing an acceleration sensor according to the invention, it is preferable that said metal membrane are formed the material selected from the group consisting of tungsten (W) and titanium nitride (TiN) and said metal membranes are formed by CVD method.

In the method of manufacturing an acceleration sensor according to the invention, it is preferable that said metal membrane are formed the material selected from the group consisting of tungsten (W) and titanium nitride (TiN) and said metal membranes are formed by sputtering method.

BRIEF DESCRIPTION OF THE DRAWINGS

FIGS. 4 (*a*) to (*h*) are sectional views showing sequentially in order a method of manufacturing the acceleration sensor according to the first embodiment of the invention.

FIGS. 5 (a) to (f) are sectional views showing sequentially in order a method of manufacturing an acceleration sensor according to a second embodiment of the invention.

DESCRIPTION OF THE PREFERRED EMBODIMENTS

Embodiment 1

Figure 1:
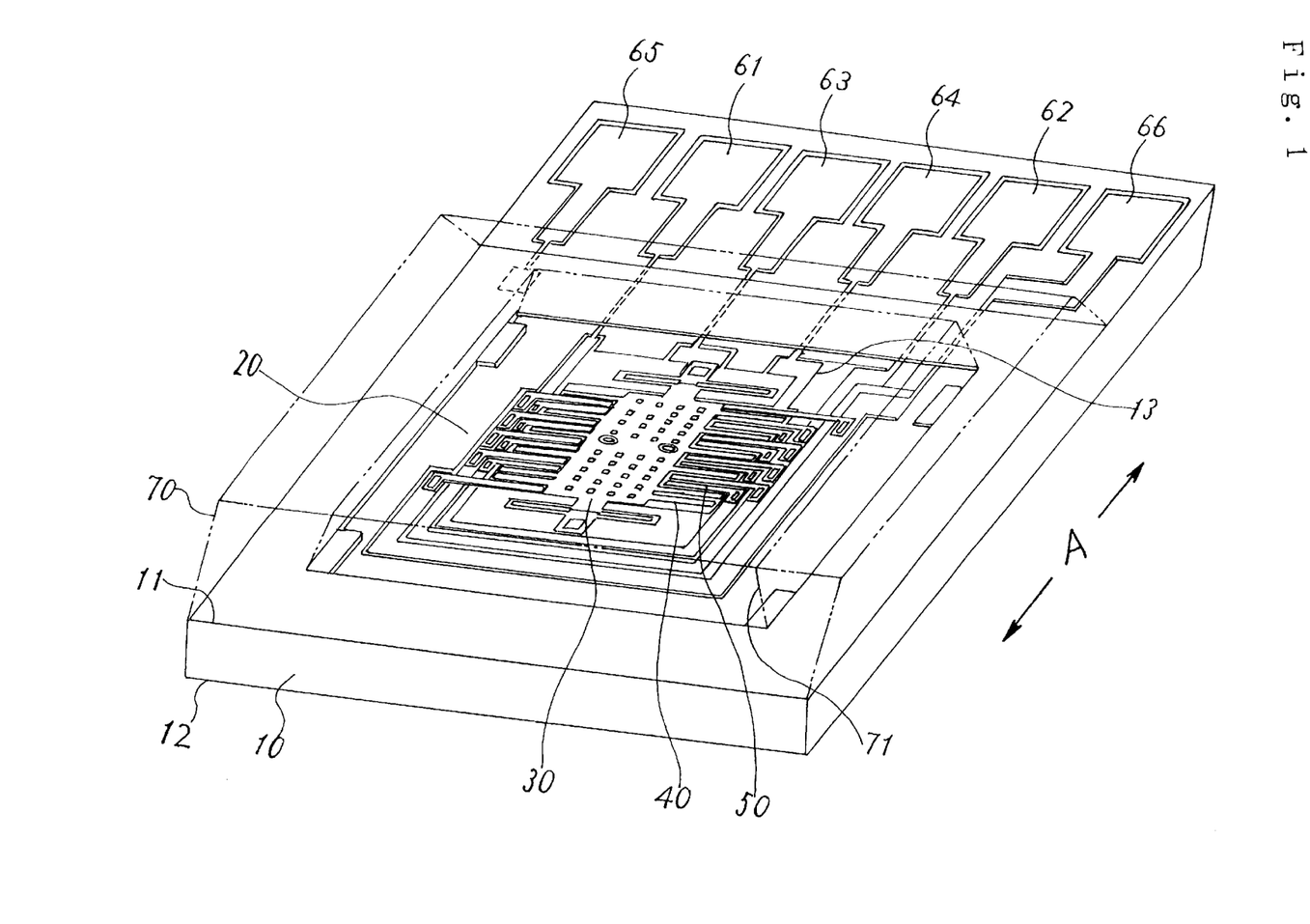
FIG. 1 is a perspective view showing an acceleration sensor according to a first embodiment of the present invention.

A preferred embodiment of the present invention is herein after described with reference to the drawings. FIG. 1 shows a sensor chip of a first embodiment of an acceleration sensor according to the present invention. The acceleration sensor according to this embodiment is an acceleration sensor of surface treatment type comprised of an acceleration sensor chip shown in FIG. 1 and an amplifier chip not shown, and detects acceleration or deceleration. The acceleration sensor chip in FIG. 1 comprises a semiconductor substrate 10, a sensor element 20 formed thereon and a silicon cap 70 covering the sensor element 20. The sensor element 20 forms a capacitor for detection. This acceleration sensor is a capacitor-type sensor in which a capacitance value of the capacitor for detection varies corresponding to acceleration (deceleration).

The semiconductor substrate 10 is a rectangular silicon substrate which is, for example, 2.7 mm in length, 1.8 mm in width, 0.4 mm in thickness, and includes an upper main surface 11 and a lower main surface 12 opposite to each other. On the upper main surface 11, the sensor element 20 is formed, and at the end portion adjacent thereto, a group of electrode pads 60 are disposed. These electrode pads 60 are consisted of two fixed electrode pads 61, 62, a movable electrode pad 63, a shield electrode pad 64, a GND electrode pad to be grounded 65 and an actuation electrode pad 66. These electrode pads are disposed in a row. The silicon cap 70 is for sealing the sensor element 20, and a space 71 is formed in the interior thereof. In this space 71, the sensor element 20 is accommodated. The sensor element 20 is formed on a shield electrode layer 13 that is attached to the upper main surface 11 of the semiconductor substrate 10, and includes a mass member 30, a movable electrode 40 and a fixed electrode 50. These mass member 30, movable electrode 40 and fixed electrode 50 are mainly composed of a thin polyimide material respectively.

Figure 2:
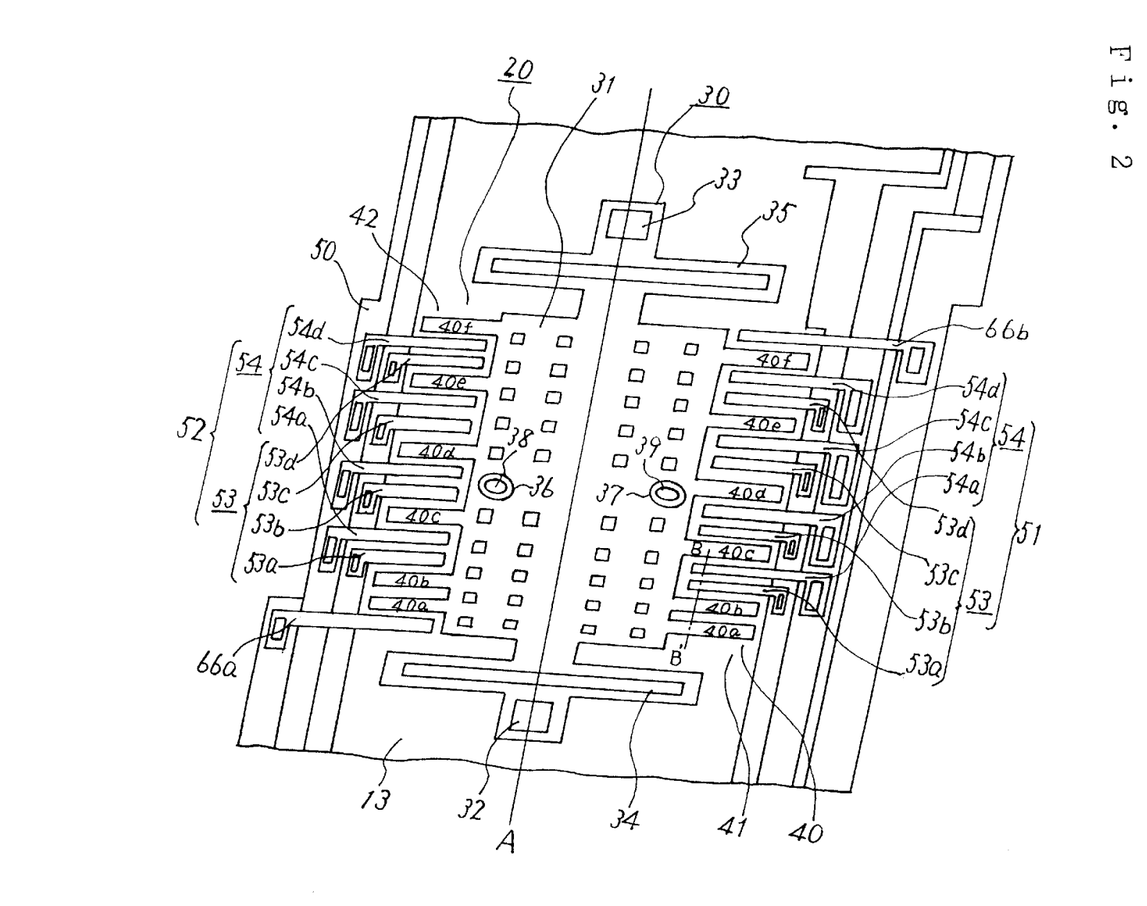
FIG. 2 is a partially enlarged view showing a sensor element of the acceleration sensor according to the first embodiment of the invention.

FIG. 2 is a partially enlarged view showing the sensor element 20 of the acceleration sensor chip shown in FIG. 1. The mass member 30 includes a mass body 31 of rectangular configuration at the central portion. The mass body 31 is arranged being lifted from the electrode layer 13 on the substrate 10 so as to be displaceable along a main axis A extending in a longitudinal direction of the mass body 31. At each end portion along the main axis A of the mass body 31, anchor parts 32, 33 are formed. The anchor parts 32, 33 joined and fixed the mass body 31 at their points to the shield electrode layer 13 bonded to the substrate 10. Further between the anchor parts 32, 33 and the mass body 31, beam members 34, 35 are disposed. These beam members 34, 35 are disposed at both sides of the mass body 31, and have curved portions permitting the mass body 31 to move in a direction along the main axis A. At the central portion in the direction of the main axis A of the mass body 31, two stopper apertures 36, 37 are formed. The stopper apertures 36, 37 are to limit an amount of displacement of the mass body 31. With these stopper apertures 36, 37, the stopper fingers 38, 39 fixed to the shield electrode layer 13 are engaged.

In addition, on both right and left sides of the mass body 31, movable electrode assemblies 41, 42 are integrally joined to the mass body 31. The movable electrode assemblies 41, 42 form the moving electrode 40. The movable electrode assemblies 41, 42 are arranged symmetrical to each other on both right and left sides of the mass body 31. Further the movable electrode assemblies 41, 42 respectively include a plurality of, e.g., six rod-like patterns 40a, 40b, 40c, 40d, 40e and 40f that are protruded from each of edges on both right and left sides of the mass body 31. These rod-like patterns 40a, 40b, 40c, 40d and 40f are formed parallel to each other. The fixed electrode 50 includes a pair of fixed electrode assemblies 51, 52 that are incorporated into the moving electrode assemblies 41, 42 respectively. These fixed electrode assemblies 51, 52 are also arranged in a symmetrical form to each other on both right and left sides of the mass body 31. Each of the fixed electrode assemblies 51, 52 include a first group of electrodes 53 connected to the shield electrode layer 13 and a second group of fixed electrodes 54 connected to the fixed electrode pads 61, 62. The first group of fixed electrodes 53 has four rod-like patterns 53a, 53b, 53c and 53d. Also the second group of fixed electrodes 54 has four rod-like patterns 54a, 54b, 54c and 54d. These rod-like patterns are disposed parallel to each other, and further also parallel to each of the rod-like patterns 40a, 40b, 40c, 40d and 40f of each movable electrode assembly 41 or 42 as well as opposite thereto at predetermined distances.

Between the rod-like patterns of the movable electrode 40 and each of the rod-like patterns of the fixed electrode 50, capacitor elements are respectively formed. These capacitor elements are connected in parallel with each other thereby forming a capacitor for detection. Furthermore, connected to the actuator electrode pad 66 are two actuator electrodes 66a, 66b disposed at both sides of the mass body 31. The electrode 66a is opposite to the rod-like pattern 40a of the movable electrode 40, and the electrode 66b is opposite to the rod-like pattern of the movable electrode 40, respectively.

Figure 3:
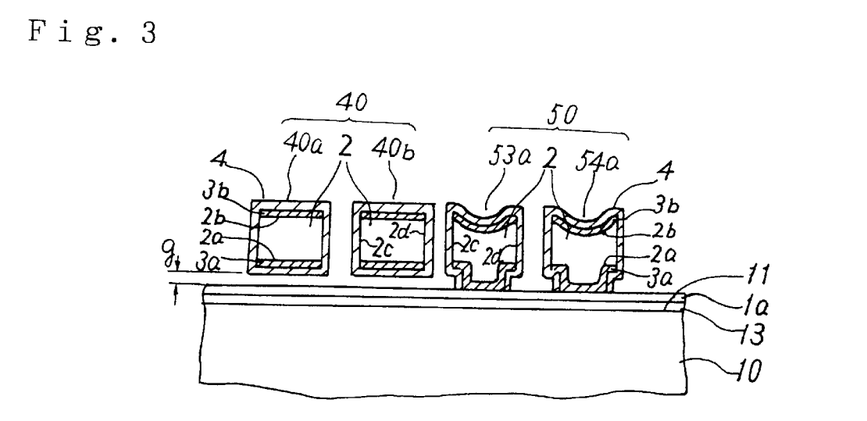
FIG. 3 is a sectional view showing an electrode construction of the acceleration sensor according to the first embodiment of the invention.

Next, construction of the movable electrode 40 and the fixed electrode 50 of the acceleration sensor according to this first embodiment is hereinafter described. FIG. 3 is a sectional view taken along the line B–B' in FIG. 2. The acceleration sensor according to this embodiment includes the mass member 30 disposed over the upper main surface 11 of the semiconductor substrate 10. This mass member 30 is joined to the movable electrode 40 to be displaceable together with the movable electrode 40. The mass member 30 and the movable electrode 40 are separated from a silicon oxide membrane 1a covering the shield electrode 13 on the substrate surface 11 to be in a lifted state by a clearance g. The mass member 30 and each of the rod-like patterns of the movable electrode 40, for example, the rod-like patterns 40a, 40b shown in FIG. 3 include a thin polyimide material 2 provided over the main surface 11 of the semiconductor substrate 10. Further, the mass member 30 and each of the rod-like patterns of the movable electrode 40 include first and second silicon nitride membranes 3a, 3b respectively provided onto a pair of main surfaces 2a, 2b of the thin polyimide membrane 2 substantially parallel to the substrate surface. These first and second silicon nitride membranes 3a, 3b serve as a flattening membrane for the purpose of restraining the thin polyimide membrane 2 from being warped due to contraction thereof. Furthermore, it is appropriate that the thin polyimide membrane 2 is within the range of 3 to 15 μm in thickness, however, a thickness thereof in this embodiment is established to be 5 μm. Additionally, it is appropriate that the first and second silicon nitride membranes are within the range of 0.1 to 0.5 μm in thickness, however, thickness thereof in this embodiment is established to be 0.1 μm.

In addition, the fixed electrode 50 according to this embodiment is formed by joining via the silicon oxide membrane 1a to the shield electrode 13 on the upper main surface 11 of the semiconductor substrate 10. The rod-like patterns of the fixed electrode 50,for example,the rod-like patterns 53a, 54a shown in FIG. 3, in the same manner as the mass member 30 and the movable electrode 40, include the thin polyimide membrane 2 provided on the main surface 11 of the semiconductor substrate 10. Further the rod-like patterns of the fixed electrode 50 include the silicon nitride membranes 3a, 3b respectively provided onto a pair of the main surfaces 2a, 2b of the thin polyimide membrane 2 substantially parallel to the substrate surface. The lower silicon nitride membrane 3a is joined to the shield electrode 13 via the silicon oxide membrane 1a.

Moreover, the first and second silicon nitride membranes 3a, 3b formed onto a pair of the main surfaces 2a, 2b substantially parallel to the substrate surface of the thin polyimide membrane 2 forming the movable electrode 40, are covered with a metal membrane 4. Further, end faces 2c, 2d providing a connection between a pair of the main surfaces 2a, 2b are also covered with the metal membrane 4. As to the thin polyimide membrane 2 forming the fixed electrode 50, the second silicon nitride membrane 3b formed onto the main surface 2b substantially parallel to the substrate surface and the end faces 2c, 2d of the thin polyimide membrane 2 are covered with the same metal membrane 4. These metal membranes 4 are necessary for use as en electrode, and material thereof such as nickel (Ni), gold (Au) or copper (Cu) is employed.

Now, a manufacturing method of the acceleration sensor according to this first embodiment is described with reference to FIGS. 4 (a) to (h). These drawings show cross sections of one of a plurality of the first rod-like patterns of the fixed electrode 50 and one of a plurality of the second rod-like patterns of the movable electrode 40. Both rod-like patterns are respectively cut in a direction of detecting acceleration (in a direction of the main axis A).

First, onto the shield electrode 13 on the upper main surface 11 of the silicon substrate 10, a silicon oxide membrane (SiO2) 1a of 0.1 μm in thickness is formed by high-temperature treatment. Further, a silicon oxide membrane 1b of 0.4 μm in thickness is formed by plasma CVD method. Subsequently, a first resist not shown is applied onto the silicon oxide membrane 1b and patterned by photomechanical process. Using this first resist as a mask, the silicon oxide membrane 1b is removed by etching at a predetermined region where a first block 50a having a plurality of the first rod-like patterns is to be formed later. Next, on this substrate, the first silicon nitride membrane 3a of 0.1 μm in thickness is formed by a method of plasma CVD. Subsequently, a polyimide membrane of 5 μm in thickness is applied onto the first silicon nitride membrane 3a by method of spin coating, and set at 300° C. to 370° C. thereby forming the thin polyimide membrane 2. Further, the second silicon nitride membrane 3b of 0.1 μm in thickness is formed on to the thin polyimide membrane 2 by plasma CVD method (FIG.4 (a)).

Figure 4:
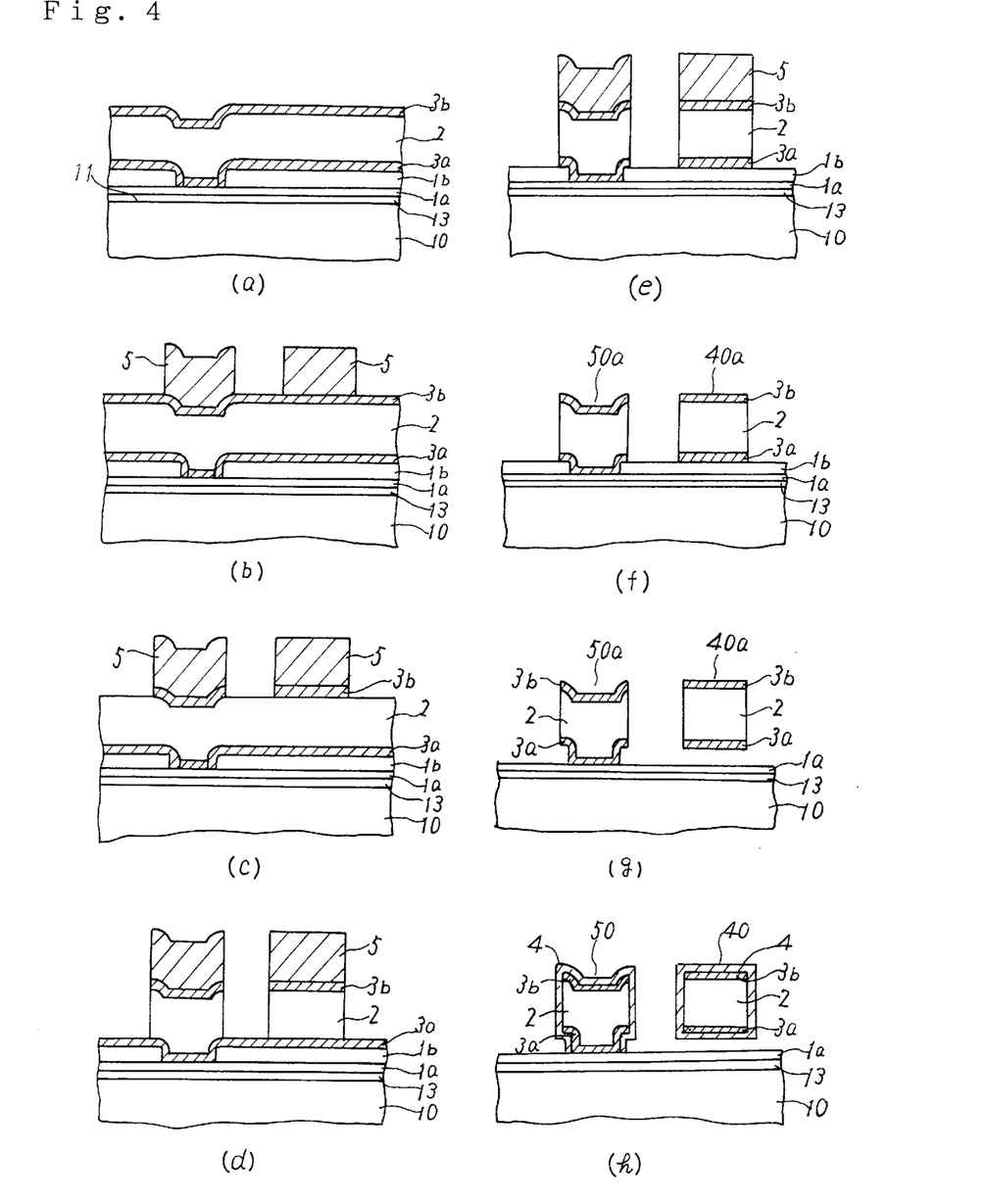

Next, a second resist 5 is applied onto the second silicon nitride membrane 3b and patterned by photomechanical process (FIG. 4 (b)). Then, using the second resist 5 as a mask, the second silicon nitride membrane 3b is dry-etched (FIG. 4 (c)). Subsequently, using the second resist 5 and the second silicon nitride membrane 3b as masks, the thin polyimide membrane 2 is etched with Polyimide Etchant (produced by Hitachi Chemical Co., Ltd.) of which principal component is hydrazine (FIG. 4 (d)). Further, using the second resist 5, the second silicon nitride membrane 3b and the thin polyimide membrane 2 as masks, the first silicon nitride membrane 3a is dry-etched (FIG. 4 (e)). Subsequently, the second resist 5 is removed. Then, the first block 50a having a plurality of the first rod-like patterns parallel to each other, and the second block 40a having a plurality of the second rod-like patterns opposite to each of a plurality of the first rod-like patterns and the mass block joined to a plurality of the second rod-like patterns are formed on the substrate 10 (FIG. 4 (f)). Thereafter, the silicon oxide membrane 1b is removed by flat etching with diluted hydrofluoric acid, whereby the second block 40a is separated from the surface 11 of the substrate 10 to form a plurality of the second rod-like patterns and the mass member joined thereto (FIG. 4(g)). Finally, the main surface of the first block 50a substantially parallel to the substrate surface and the end faces thereof are coated with the metal membrane 4 such as Ni, Au or Cu by electrolytic plating to form the fixed electrode 50. At the same time, a pair of the main surfaces of the second block 40a substantially parallel to the substrate surface and the end faces providing a connection therebetween is coated with the same metal membrane 4 by electrolytic plating. Thus, the movable electrode 40 and the mass member 30 joined thereto are formed.

As described above, in this embodiment, the mass member 30 is mainly comprised of the thin polyimide membrane 2 provided on the substrate surface. Therefore, the mass member 30 can be manufactured in a shorter time and more easily as compared with the conventional construction utilizing a polysilicon membrane. As a result, shortening of manufacturing time and lower cost are achieved. Moreover, the first and second silicon nitride membranes 3a, 3b being flattening membranes are provided onto the pair of the main surfaces 2a, 2b of the thin polyimide membrane 2 substantially parallel to the substrate surface so that the thin polyimide membrane 2 is restrained from being warped. Accordingly, the movable electrode 40 and the fixed electrode 50 can be formed at precisely the same relative positions and with distances as designed. In this manner, instability or non-uniformity in performance of individual acceleration sensor chips can be surpassed, and as a result a highly reliable acceleration sensor can be obtained.

Embodiment 2

Figure 5:
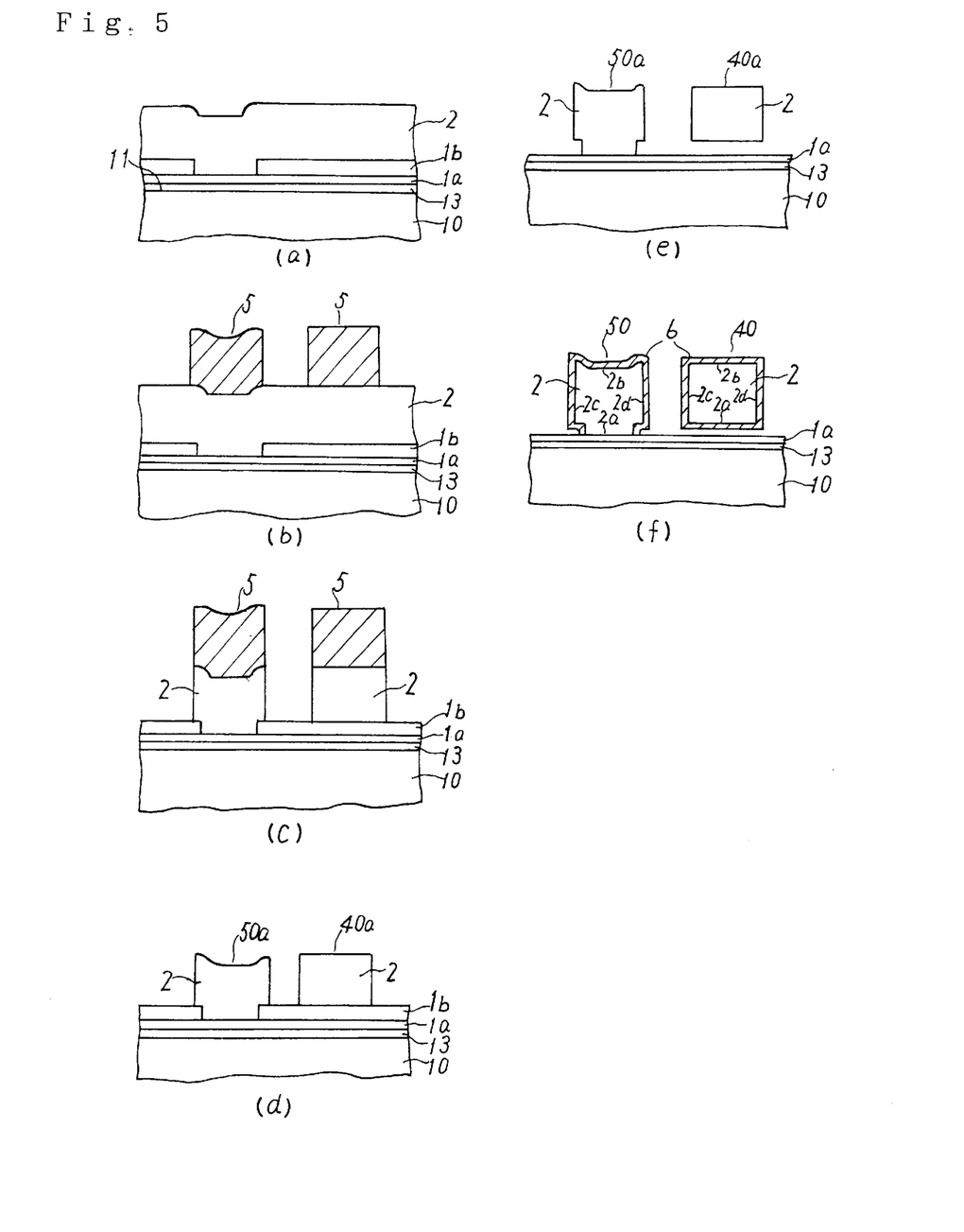

FIGS. 5 (a) to (f) are sectional views showing sequentially in order a method of manufacturing an acceleration sensor according to a second embodiment of the invention. Since the construction of the acceleration sensor according to this second embodiment is the same as that of the first embodiment described above (FIG. 1), further description thereof is omitted herein. In the acceleration sensor of this embodiment, as shown in FIG. 5 (f), the movable electrode 40 and the mass member 30 joined thereto are mainly composed of a thin polyimide membrane 2 provided on the substrate surface. Further, a pair of main surfaces 2a, 2b of the thin polyimide membrane 2 substantially parallel to the substrate surface and the end faces 2c, 2d for connection between the pair of main surfaces are respectively covered with a metal membrane 6 such as tungsten (W) or titanium nitride (TiN). Likewise, the fixed electrode 50 is mainly fabricated of the thin polyimide membrane 2, and the main surface 2b of the thin polyimide membrane 2 substantially parallel to the substrate surface and the end faces 2c, 2d thereof are covered with the same metal membrane 6. This metal membrane 6 serves as both a flattening membrane and a metal membrane necessary for use as en electrode. Additionally, in the drawings, the same reference numerals are designated to the same or like parts.

Now a manufacturing method of the acceleration sensor according to this preferred embodiment is described with reference to FIGS. 5 (a) to (f). Each of FIGS. 5 (a) to (f) shows cross sections of one of a plurality of the first rod-like patterns of the fixed electrode 50 and one of a plurality of the second rod-like patterns of the movable electrode 40 respectively cut in a direction of acceleration detection (in a direction of the main axis A).

First, a silicon oxide membrane 1a of 0.1 μm in thickness is formed on the upper main surface 11 of the silicon substrate 10 by high-temperature processing. Further a silicon oxide membrane 1b in thickness of 0.4 μm is formed by plasma CVD method. Subsequently, a first resist not shown is applied onto the silicon oxide membrane 1b, and patterned by photomechanical process. Using the first resist as a mask, the silicon oxide membrane 1b at the region where a first block 50a having a plurality of the first rod-like patterns will be formed later is removed by etching. Next, a polyimide membrane of 5 μm in thickness is applied onto the substrate by spin coating method, and set at 300° C. to 370° C. thereby forming a thin polyimide membrane 2 (FIG. 5(a)).

Next, a second resist 5 is applied onto the thin polyimide membrane 2 and patterned by photomechanical process (FIG. 5(b)). Using the second resist 5 as a mask, the thin polyimide membrane 2 is etched using Polyimide Etchant (produced by Hitachi Chemical co., Ltd.) a principal component of which is hydrazine (FIG. 5(c)). Subsequently, the second resist 5 is removed to form the first block 50a including a plurality of the first rod-like patterns parallel to each other and the second block 40a including a plurality of the second rod-like patterns opposite to each of the plurality of the first rod-like patterns and the mass block joined thereto are formed on the substrate 10 (FIG. 5 (d)).

Thereafter, the silicon oxide membrane 1b is removed by overall etching with diluted hydrofluoric acid. Then the second block 40a is separated from the surface 11 of the substrate 10 to form the mass member 30 consisted of a plurality of the second rod-like patterns and the mass body 31 joined thereto (FIG. 5 (e)). Finally, the main surface 2b of the first block 50a substantially parallel to the substrate surface and the end faces 2c, 2d there of are coated with a metal membrane 6 to form the fixed electrode 50. At the same time, a pair of the main surfaces 2a, 2b of the second block 40a substantially parallel to the substrate surface and the end faces 2c, 2d therebetween are coated with the same metal membrane 6 to form the moving electrode 40 and the mass member 30 joined thereto (FIG. 5 (f)). In this respect, used as the metal membrane 6 is a tungsten membrane of which coating is performed by CVD method or a titanium nitride membrane of which coating is performed by CVD method or sputtering.

According to this embodiment, in the same manner as the foregoing first embodiment, the mass member 30 is mainly composed of the thin polyimide membrane 2 provided on the substrate surface. Therefore a shorter manufacturing period and lower cost is achieved as compared with the conventional construction utilizing a polysilicon membrane. Further, a pair of the main surfaces 2a, 2b of the thin polyimide membrane 2 substantially parallel to the substrate surface and the end faces 2c, 2d providing a connection between this pair of the main surfaces 2a, 2b are both coated with the metal membrane 6 such as tungsten or titanium nitride to flatten the thin polyimide material 2. Therefore the thin polyimide material is restrained from being warped, and instability or non-uniformity in performance of individual acceleration sensor chips is controlled so that a highly reliable acceleration sensor can be obtained. Furthermore, in the second embodiment, since the metal membrane 6 such as tungsten or titanium nitride is used as a flattening membrane of the thin polyimide material 2, an electrolytic plating process required in the foregoing first embodiment can be omitted. In this manner, the process is further simplified.

What is claimed is:

1. An acceleration sensor comprising:
   a fixed electrode including a plurality of first rod-like patterns aligned parallel to each other on a substrate surface;
   a movable electrode including a plurality of second rod-like patterns aligned parallel to each other over the substrate surface so as to be opposite to each of the plurality of said first rod-like patterns with predetermined distances; and
   a mass member disposed over the substrate surface and joined to said movable electrode to be displaceable together with said movable electrode;
   wherein said mass member includes a thin polyimide membrane provided over the substrate surface and silicon nitride membranes provided respectively on a pair of main surfaces of said thin polyimide membrane substantially parallel to the substrate surface.

2. The acceleration sensor according to claim 1, wherein each of said silicon nitride membranes is covered with a metal membrane, and end faces between the pair of said main surfaces of said thin polyimide membrane are covered with a metal membrane.

3. An acceleration sensor comprising:
   a fixed electrode including a plurality of first rod-like patterns aligned parallel to each other on a substrate surface;
   a movable electrode including a plurality of second rod-like patterns aligned parallel to each other over the substrate surface so as to be opposite to each of the plurality of said first rod-like patterns with predetermined distances; and
   a mass member disposed over the substrate surface and joined to said movable electrode to be displaceable together with said movable electrode, said mass member including a thin polyimide membrane provided over the substrate surface;
   wherein a pair of main surfaces of said thin polyimide membrane substantially parallel to the substrate surface and end faces between the pair of the main surfaces of said thin polyimide membrane are respectively covered with a metal membrane.

4. The acceleration sensor according to claim 3, wherein said metal membrane is formed by the material selected from the group consisting of tungsten (W) and titanium nitride (TiN).

5. A method of manufacturing an acceleration sensor, the acceleration sensor comprising: a fixed electrode including a plurality of first rod-like patterns aligned parallel to each other on a substrate surface; a movable electrode including a plurality of second rod-like patterns aligned parallel to each other over the substrate surface so as to be opposite to each of the plurality of said first rod-like patterns with predetermined distances; and a mass member disposed over the substrate surface and joined to said movable electrode to be displaceable together with said movable electrode;

the method comprising the steps of:
- forming a silicon oxide membrane on the substrate surface by plasma CVD method;
- applying a first resist onto said silicon oxide membrane and patterning said first resist by photomechanical process;
- removing a predetermined portion of said silicon oxide membrane by etching using said first resist as a mask;
- forming a first silicon nitride membrane on the substrate surface by plasma CVD method for covering said silicone oxide membrane;
- applying a polyimide material onto said first silicon nitride membrane and forming a thin polyimide membrane by setting the polyimide material at 300° C. to 370° C.;
- forming a second silicon nitride membrane on said thin polyimide membrane by plasma CVD method;
- applying a second resist onto said second silicon nitride membrane and patterning said second resist by photomechanical process;
- etching sequentially said second silicon nitride membrane, said thin polyimide membrane and said first silicon nitride membrane using said second resist as a mask, thereby forming on the substrate a first block including the plurality of said first rod-like patterns at said predetermined portion, and a second block including the plurality of second rod-like patterns and a mass block joined thereto;
- removing said silicon oxide membrane by etching and separating said second block from the substrate surface; and
- coating a main surface of said first block substantially parallel to the substrate surface and end faces thereof with a metal membrane thereby forming said fixed electrode, and coating a pair of main surfaces of said second block substantially parallel to the substrate surface and end faces thereof with the same metal membrane thereby forming said movable electrode and said mass member.

6. A method of manufacturing an acceleration sensor, the acceleration sensor comprising: a fixed electrode including a plurality of first rod-like patterns aligned parallel to each other on a substrate surface; a movable electrode including a plurality of second rod-like patterns aligned parallel to each other over the substrate surface so as to be opposite to each of the plurality of said first rod-like patterns with predetermined distances; and a mass member disposed over the substrate surface and joined to said movable electrode to be displaceable together with said movable electrode;

the method comprising the steps of:
- forming a silicon oxide membrane on the substrate surface by plasma CVD method;
- applying a first resist onto said silicon oxide membrane and patterning said first resist by photomechanical process;
- removing a predetermined portion of said silicon oxide membrane by etching using said first resist as a mask;
- applying a polyimide material onto the substrate surface and forming a thin polyimide membrane by setting the polyimide material at 300° C. to 370° C.;
- applying a second resist onto said thin polyimide membrane and patterning said second resist by photomechanical process;
- etching said thin polyimide membrane using said second resist as the mask thereby forming on the substrate surface a first block including the plurality of said first rod-like patterns at said predetermined portion, and a second block including the plurality of said second rod-like patterns and a mass block joined thereto;
- removing said silicon oxide membrane by etching and separating said second block from the substrate surface; and
- coating a main surface of said first block substantially parallel to the substrate surface and end faces thereof with a metal membrane thereby forming said fixed electrode, and further coating a pair of main surfaces of said second block substantially parallel to the substrate surface and end faces thereof with the same metal membrane thereby forming said movable electrode and said mass member.

7. The method of manufacturing an acceleration sensor according to claim 6, wherein said metal membranes are formed by the material selected from the group consisting of tungsten (W) and titanium nitride (TiN) and said metal membranes are formed by CVD method.

8. The method of manufacturing an acceleration sensor according to claim 6, wherein said metal membranes are formed by the material selected from the group consisting of tungsten (W) and titanium nitride (TiN) and said metal membranes are formed by sputtering method.

* * * * *